(12) United States Patent
Zheng et al.

(10) Patent No.: US 11,906,666 B2
(45) Date of Patent: Feb. 20, 2024

(54) OPTICAL DEVICE HAVING TWO SCANNING COMPONENTS

(71) Applicant: Lumentum Operations LLC, San Jose, CA (US)

(72) Inventors: Jiamin Zheng, Ottawa (CA); Barrie P. Keyworth, Ottawa (CA); Wenlin Jin, Ottawa (CA)

(73) Assignee: Lumentum Operations LLC, San Jose, CA (US)

( * ) Notice: Subject to any disclaimer, the term of this patent is extended or adjusted under 35 U.S.C. 154(b) by 0 days.

(21) Appl. No.: 18/054,969

(22) Filed: Nov. 14, 2022

(65) Prior Publication Data

US 2023/0146243 A1 May 11, 2023

Related U.S. Application Data

(63) Continuation of application No. 16/725,603, filed on Dec. 23, 2019, now Pat. No. 11,500,070.

(60) Provisional application No. 62/895,744, filed on Sep. 4, 2019.

(51) Int. Cl.
*G02B 26/10* (2006.01)
*G01S 7/481* (2006.01)

(52) U.S. Cl.
CPC .......... *G01S 7/4817* (2013.01); *G02B 26/101* (2013.01)

(58) Field of Classification Search
None
See application file for complete search history.

(56) References Cited

U.S. PATENT DOCUMENTS

| | | | |
|---|---|---|---|
| 7,978,389 B2 | 7/2011 | Ishibashi | |
| 9,488,830 B2 | 11/2016 | Krueger et al. | |
| 11,500,070 B2 | 11/2022 | Zheng et al. | |
| 2002/0057481 A1* | 5/2002 | Souda | G02B 26/105 359/212.2 |
| 2006/0039056 A1 | 2/2006 | Lee | |
| 2011/0242635 A1 | 10/2011 | Oka | |
| 2016/0187646 A1 | 6/2016 | Ehrmann | |
| 2017/0052366 A1 | 2/2017 | Yamano | |
| 2019/0137255 A1 | 5/2019 | Chong | |

FOREIGN PATENT DOCUMENTS

| | | |
|---|---|---|
| CN | 101430377 A | 5/2009 |
| CN | 101874221 A | 10/2010 |
| CN | 105324722 A | 2/2016 |
| CN | 107257931 A | 10/2017 |
| CN | 108490420 A | 9/2018 |
| KR | 20060016545 A | 2/2006 |
| WO | 2016134321 A1 | 8/2016 |

* cited by examiner

*Primary Examiner* — Jennifer D. Carruth
(74) *Attorney, Agent, or Firm* — Harrity & Harrity, LLP

(57) ABSTRACT

An optical device may include a lens system. The optical device may include a first scanning component to receive an optical beam and to scan the lens system with the optical beam. The optical device may include a second scanning component to receive the optical beam from the lens system and to scan a field of view with the optical beam, where the lens system is positioned between the first scanning component and the second scanning component. The lens system may include a beam expander.

20 Claims, 8 Drawing Sheets

OPTICAL DEVICE HAVING TWO SCANNING COMPONENTS

RELATED APPLICATION

This application is a continuation of U.S. patent application Ser. No. 16/725,603, filed Dec. 23, 2019 (now U.S. Pat. No. 11,500,070), which claims priority to U.S. Provisional Patent Application No. 62/895,744 for "TWO SCANNER LIDAR," filed on Sep. 4, 2019, the contents of which are incorporated herein by reference in their entireties.

TECHNICAL FIELD

The present disclosure relates generally to light detection and ranging (lidar) devices and, more particularly, to a lidar device with two scanning components.

BACKGROUND

A lidar system may produce an optical beam (e.g., a laser beam and/or the like), scan the optical beam across a field of view including one or more objects, receive a beam reflected from objects in the field of view, process the received beam, and determine three-dimensional aspects of the one or more objects. For example, the lidar system, based on light reflected from objects in the field of view, may construct a point cloud to determine the three-dimensional aspects of the one or more objects. A lidar system may include a scanner for scanning an optical beam across a field of view, receiving light reflected from the field of view, and providing the light reflected from the field of view to a receiver for processing. Another lidar system may include two scanners cascaded in series such that one scanner may scan an optical beam onto the other scanner, which may scan the optical beam across a field of view.

SUMMARY

According to some possible implementations, an optical device may include a first lens; a first scanning component to receive an optical beam having a first beam size and to scan the first lens with the optical beam, wherein the first lens is to increase a beam size of the optical beam to a second beam size, and wherein the second beam size is greater than the first beam size; a second lens to receive the optical beam having the second beam size; and a second scanning component to receive, from the second lens, the optical beam having the second beam size and to scan a field of view with the optical beam having the second beam size; and wherein the first lens and the second lens are positioned between the first scanning component and the second scanning component.

According to some possible implementations, an optical device may include a first lens; a first scanning component to receive an optical beam and to scan the first lens with the optical beam, wherein the first scanning component comprises an angular scanning component having a first axis of orientation; a second lens to receive the optical beam; and a second scanning component to receive, from the second lens, the optical beam, wherein the second scanning component comprises an angular scanning component having a second axis of orientation, wherein the second axis is perpendicular to the first axis, and wherein the second scanning component is to scan a two-dimensional field of view with the optical beam; and wherein the first lens and the second lens are positioned between the first scanning component and the second scanning component.

According to some possible implementations, an optical device may include a lens system; a first scanning component to receive an optical beam and to scan the lens system with the optical beam; and a second scanning component to receive the optical beam from the lens system and to scan a field of view with the optical beam, wherein the lens system is positioned between the first scanning component and the second scanning component.

DETAILED DESCRIPTION

The following detailed description of example implementations refers to the accompanying drawings. The same reference numbers in different drawings may identify the same or similar elements.

As described above, a lidar system may include a scanner for scanning an optical beam across a field of view, receiving a beam reflected from the field of view, and providing the beam reflected from the field of view to a receiver for processing. However, the scanner may be constrained by a size constraint (e.g., to fit within an optical sub-assembly, to conserve space in an optical design, and/or the like), a tilting range constraint (e.g., to avoid contacting other components within the optical sub-assembly, to steer the optical beam through a window, and/or the like), a scanning frequency constraint, and/or the like.

Figure 1:
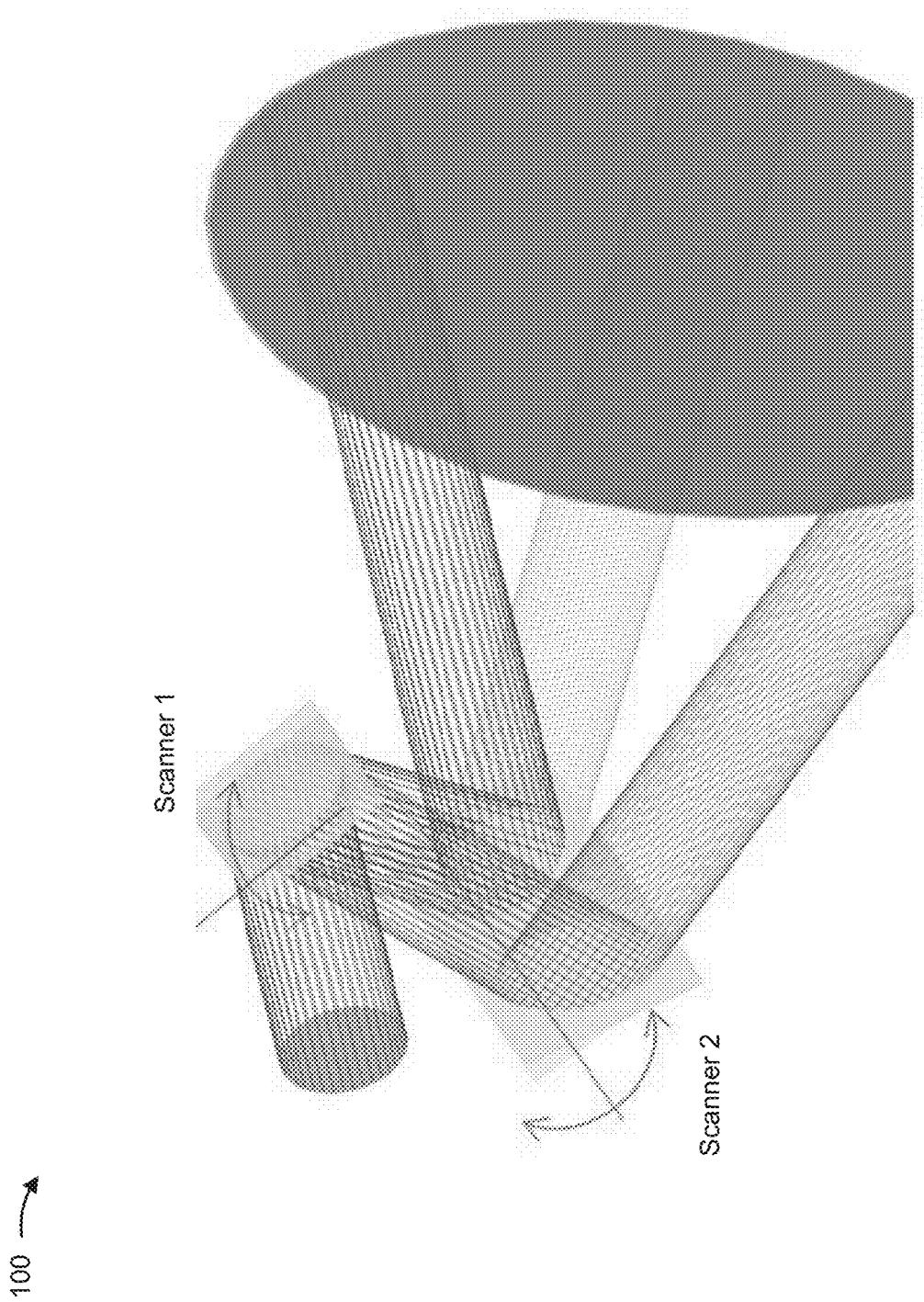
FIG. 1 is a diagram of an example optical device including two scanners.

As also described above, another lidar system may include two scanners cascaded in series such that one scanner may scan an optical beam onto the other scanner, which may scan the optical beam across a field of view. Using two scanners, such lidar systems may overcome some of the constraints described above. However, in such lidar systems, one scanner must be disposed away from the other scanner for clearance (e.g., to allow the scanners to tilt), and one of the scanners may need to be increased in size to accommodate beam walk-off. For example, and as shown in FIG. 1, angular tilting of scanner 1 may create an angular offset of the laser beam that translates into a spatial offset (e.g., a lateral offset) on scanner 2, so scanner 2 may need to be larger than scanner 1 so that the laser beam is still reflected onto scanner 2. However, increasing the scanner size may increase the cost of the scanner and consume space in an optical design, an optical sub-assembly, and/or the like.

Some implementations described herein provide an optical device that may include a lens system positioned between a first scanner (e.g., a first scanning component) and a second scanner (e.g., a second scanning component). In some implementations, the first scanner may receive an optical beam and scan the lens system with the optical beam, and the second scanner may receive the optical beam from the lens system and scan a field of view with the optical beam. In some implementations, the lens system has a first focal point and a second focal point, where the first focal point and the second focal point are on opposite sides of the lens system, and where the first scanner is positioned at the first focal point, and the second scanner is positioned at the second focal point. In some implementations, the first scanner and the second scanner may have a similar size. In this way, the optical device may conserve cost and space in an optical design, an optical sub-assembly, and/or the like that would otherwise be consumed by increasing the size of one of the scanners (e.g., to accommodate for beam walk-off and/or the like).

Additionally, an optical device may maintain a small beam size as the laser beam passes from a laser source through an optical system to the scanner. By maintaining a small beam size, the optical device may conserve cost and space in an optical design, an optical sub-assembly, and/or the like that would otherwise be consumed by using a larger beam size, which would require the optical system to be larger. In some implementations, the optical device, to achieve higher resolution than may be achieved with the small beam size, may include a beam expander positioned between the field of view and the scanner that scans the beam across the field of view, where the beam expander increases the size of the beam scanned across the field of view.

In some implementations, an optical device including a lens system positioned between a first scanner and a second scanner may include a beam expander in the lens system. For example, rather than positioning the beam expander between the field of view and the scanner that scans the beam across the field of view, the beam expander may be positioned between the first scanner and the second scanner. By using the beam expander as part of the lens system and to increase the size of the beam scanned across the field of view, the optical device may conserve cost that would otherwise be consumed by using a lens system and a beam expander.

Figure 2:
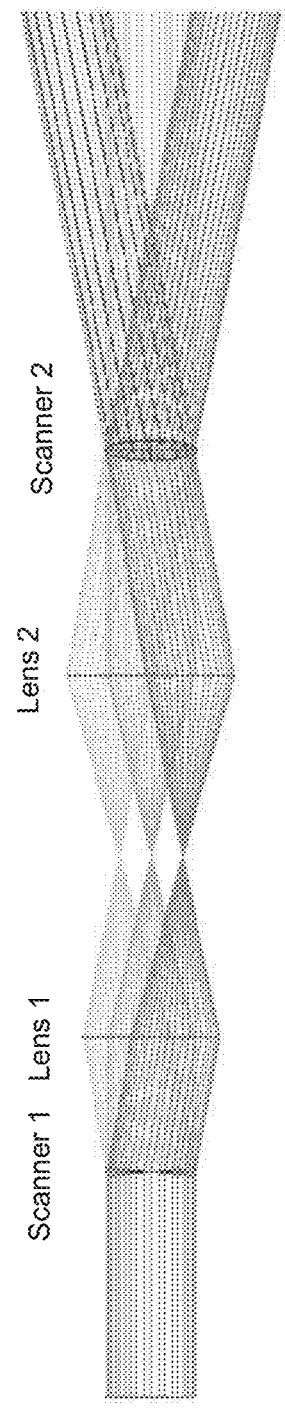
FIGS. 2-4 are diagrams of one or more example optical devices including two scanners and a lens system.

FIG. 2 is a diagram of an example optical device 200 including two scanners and a lens system as described herein. As shown in FIG. 2, the optical device 200 may include scanner 1, scanner 2, and a lens system including lens 1 and lens 2. In some implementations, and as shown in FIG. 2, scanner 1 may receive an optical beam and scan lens 1 with the optical beam. In some implementations, and as shown in FIG. 2, lens 1 and lens 2 may image scanner 1 onto scanner 2. For example, lens 1 and lens 2 may receive and refract the optical beam such that, even as scanner 1 tilts and creates an angular offset of the optical beam (e.g., with respect to an optical axis of the optical device), scanner 2 receives the optical beam. In other words, lens 1 and lens 2 may receive and refract the optical beam to prevent the angular offset created by angular tilting of scanner 1 from translating into a spatial offset (e.g., a lateral offset) on scanner 2 (e.g., beam walk-off). By preventing the angular offset created by angular tilting of scanner 1 from translating into a spatial offset on scanner 2, the lens system may eliminate the need to increase the size of scanner 2 and may permit scanner 1 and scanner 2 to be the same size. In this way, the lens system may conserve cost and space in an optical design, an optical sub-assembly, and/or the like that would otherwise be consumed by increasing the size of scanner 2 (e.g., to accommodate for beam walk-off and/or the like).

In some implementations, the lens system may have a first focal point and a second focal point, where the first focal point and the second focal point are on opposite sides of the lens system. In some implementations, scanner 1 may be positioned at the first focal point, and scanner 2 may be positioned at the second focal point. For example, and as shown in FIG. 2, scanner 1 may be positioned at a focal point of lens 1, and scanner 2 may be positioned at a focal point of lens 2. In some implementations, the relationship between a focal length f1 of lens 1, a focal length f2 of lens 2, a beam size s1 on scanner 1, a beam size s2 on scanner 2, an angular scanning range a1 of scanner 1, and an angular scanning range a2 of scanner 2 may be described by the following equations:

$$\frac{f1}{f2} = \frac{s1}{s2} = \frac{a2}{a1}.$$

In some implementations, if the focal length f1 of lens 1 equals the focal length f2 of lens 2, then the lens system achieves a 1:1 image of scanner 1 on scanner 2.

In some implementations, scanner 1 and/or scanner 2 may include one or more moveable mirrors to receive the optical beam and scan the optical beam. For example, scanner 1 and/or scanner 2 may include one or more mirrors that rotate along one or two axes to scan the optical beam in one or two dimensions, respectively. In some implementations, scanner 1 and/or scanner 2 may include a silicon micro-electromechanical system (MEMS).

In some implementations, scanner 1 and/or scanner 2 may be single-axis angular scanning components. For example, and as shown in FIG. 2, scanner 1 and scanner 2 may be single-axis angular scanning components having a same axis orientation (e.g., a vertical axis, a horizontal axis, a 45-degree axis, and/or the like). In some implementations, the lens system (e.g., lens 1 and lens 2) may prevent the angular offset created by angular tilting of scanner 1 from translating into a spatial offset on scanner 2 and may maintain the angular offset of the laser beam provided by scanner 1. In this way, the optical device 200 may combine the angular offset provided by scanner 1 and the angular offset provided by scanner 2 to scan a wider field of view than a field of view that may be scanned with a single scanner.

Additionally, or alternatively, scanner 1 and/or scanner 2 may be dual-axis angular scanning components. In some implementations, scanner 1 and/or scanner 2 may tilt angularly in two directions around two axes. In some implementations, the two axes may be perpendicular such that scanner 1 and/or scanner 2 tilts angularly in a vertical direction around a horizontal axis to provide a vertical angular offset to the optical beam, and in a horizontal direction around a vertical axis to provide a horizontal angular offset to the optical beam.

For example, scanner 1 may be a single-axis angular scanning component having a horizontal axis to provide a vertical angular offset, and scanner 2 may be a dual-axis angular scanning component having a horizontal axis to provide a vertical angular offset and a vertical axis to provide a horizontal angular offset. In this example, the optical device 200 may combine the vertical angular offset provided by scanner 1 and the vertical angular offset provided by scanner 2 to scan a vertically wider field of view than a field of view that may be scanned with a single scanner. Alternatively, scanner 1 may be the dual-axis angular scanning component and scanner 2 may be the single-axis angular scanning component.

In another example, scanner 1 may be a single-axis angular scanning component having a vertical axis to provide a horizontal angular offset, and scanner 2 may be a dual-axis angular scanning component having a horizontal axis to provide a vertical angular offset and a vertical axis to provide a horizontal angular offset. In this example, the optical device 200 may combine the horizontal angular offset provided by scanner 1 and the horizontal angular offset provided by scanner 2 to scan a horizontally wider field of view than a field of view that may be scanned with a single scanner. Alternatively, scanner 1 may be the dual-axis angular scanning component and scanner 2 may be the single-axis angular scanning component.

In another example, scanner 1 may be a dual-axis angular scanning component having a horizontal axis to provide a vertical angular offset and a vertical axis to provide a horizontal angular offset, and scanner 2 may be a dual-axis angular scanning component having a horizontal axis to provide a vertical angular offset and a vertical axis to provide a horizontal angular offset. In this example, the optical device 200 may combine the horizontal angular offset provided by scanner 1 and the horizontal angular offset provided by scanner 2, and combine the vertical angular offset provided by scanner 1 and the vertical angular offset provided by scanner 2 to scan a horizontally and vertically wider field of view than a field of view that may be scanned with a single scanner.

Figure 3:
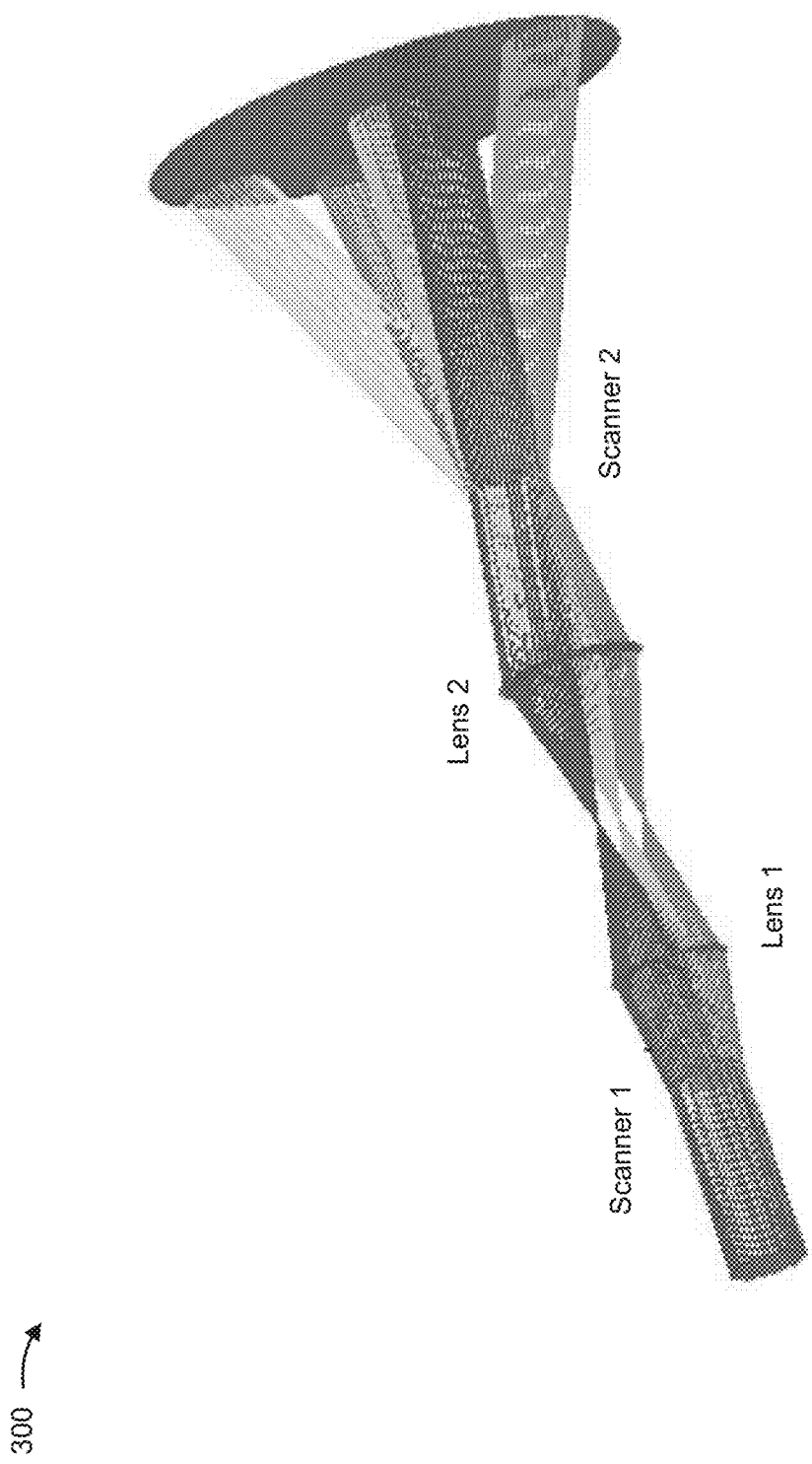

FIG. 3 is a diagram of an example optical device 300 including two scanners and a lens system as described herein. As shown in FIG. 3, the optical device 300 may include scanner 1, scanner 2, and a lens system including lens 1 and lens 2. In some implementations, scanner 1, scanner 2, the lens system, lens 1, and lens 2 of the optical device 300 may be similar to scanner 1, scanner 2, the lens system, lens 1, and lens 2 of the optical device 200 of FIG. 2. However, as shown in FIG. 3, scanner 1 and scanner 2 of optical device 300 may be single-axis angular scanning components having different axes of orientation (e.g., perpendicular axes (e.g., a vertical axis and a horizontal axis and/or the like), axes offset by an angle (e.g., 30 degrees, 35 degrees, 45 degrees, and/or the like), and/or the like).

For example, as shown in FIG. 3, scanner 1 may have a horizontal axis around which scanner 1 tilts such that scanner 1 provides the optical beam with a vertical angular offset, and scanner 2 may have a vertical axis around which scanner 2 tilts such that scanner 2 provides the optical beam with a horizontal angular offset. In some implementations, the lens system (e.g., lens 1 and lens 2) may prevent the vertical angular offset created by angular tilting of scanner 1 from translating into a spatial offset on scanner 2, and may maintain the vertical angular offset of the laser beam provided by scanner 1. In this way, the optical device 300 may combine the vertical angular offset provided by scanner 1 and the horizontal angular offset provided by scanner 2 to scan a field of view in two dimensions (e.g., a two-dimensional field of view). By using two single-axis angular scanning components to scan a field of view in two dimensions, the optical device 300 may conserve power resources, financial resources, and/or the like that would otherwise be consumed by using a dual-axis angular scanning component to scan a field of view in two dimensions.

Figure 4:
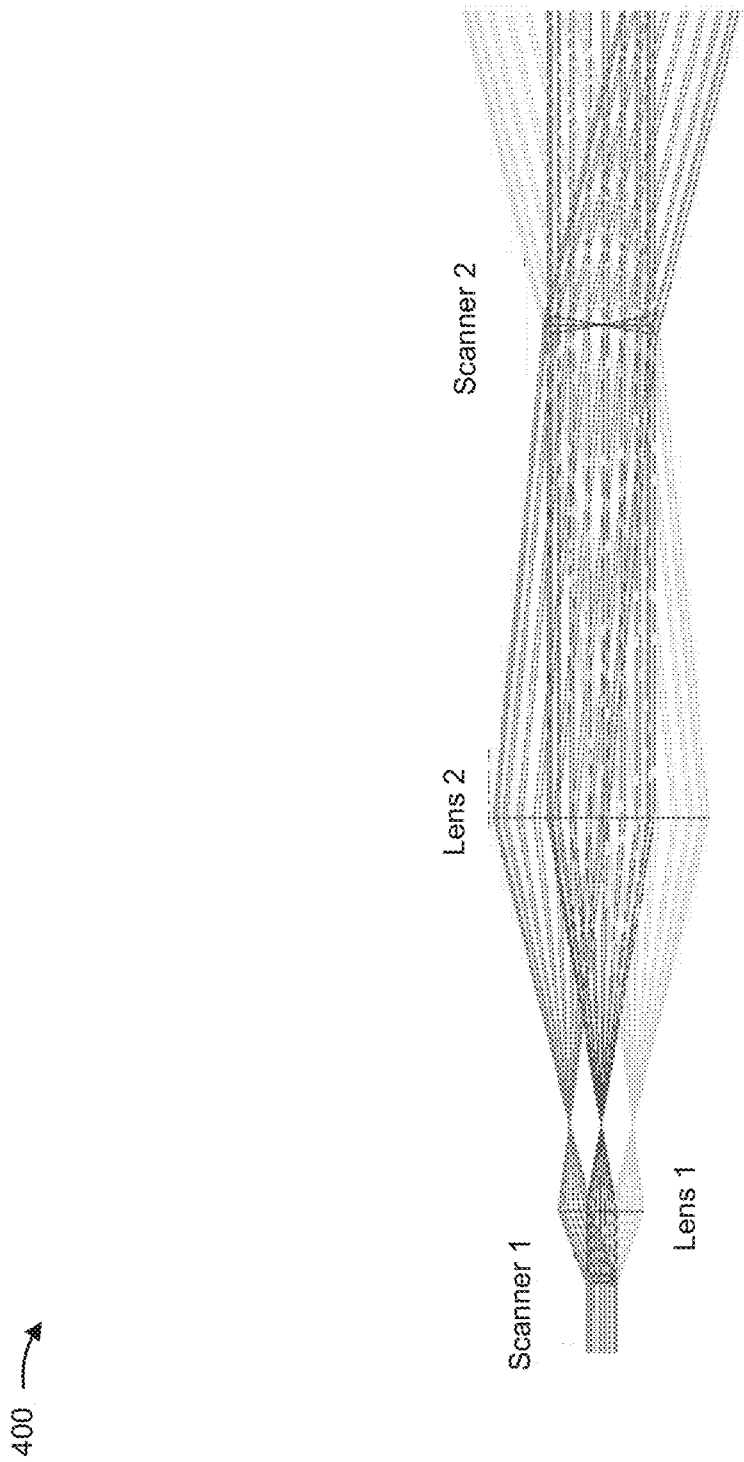

FIG. 4 is a diagram of an example optical device 400 including two scanners and a lens system as described herein. As shown in FIG. 4, the optical device 400 may include scanner 1, scanner 2, and a lens system including lens 1 and lens 2. In some implementations, scanner 1, scanner 2, the lens system, lens 1, and lens 2 of the optical device 400 may be similar to scanner 1, scanner 2, the lens system, lens 1, and lens 2 of the optical device 200 of FIG. 2. In some implementations, the lens system may be configured to increase and/or decrease a size of the optical beam.

For example, and as shown in FIG. 4, the lens system may include a beam expander to increase the size of the optical beam. In some implementations, and as shown in FIG. 4, a combination of lens 1 and lens 2 may be the beam expander. As shown in FIG. 4, lens 1 may receive, from scanner 1, a collimated optical beam having an initial size. In some implementations, lens 1 and lens 2 may be positioned such that a distance between lens 1 and lens 2 is equal to the sum of the focal length f1 of lens 1 and the focal length f2 of lens 2. As shown in FIG. 4, between lens 1 and lens 2, the optical beam decreases in size and then increases to a size greater than the initial size. In some implementations, and as shown in FIG. 4, lens 2 may receive the optical beam having an increased size, may collimate the optical beam, and may provide, to scanner 2, the collimated optical beam having the increased size. As shown in FIG. 4, scanner 2 may be larger than scanner 1, so that scanner 2 may receive the collimated optical beam having the increased size.

In this way, the optical device 400 may maintain a small beam size as the optical beam passes from a source through an optical system to scanner 1 and then increase the size of the optical beam before scanning, using scanner 2, a field of view with the optical beam. By maintaining a small beam size, the optical device 400 may conserve cost and space in an optical design, an optical sub-assembly, and/or the like that would otherwise be consumed by using a larger beam size. For example, using a larger beam size may require a larger and/or more expensive source, larger and/or more expensive components (e.g., lenses, prisms, mirrors, and/or the like) of the optical system, larger and/or more expensive scanning components, and/or the like.

Additionally, or alternatively, the optical device 400 may achieve a higher resolution than may be achieved with the small beam size. For example, the increased beam size may permit the optical device 400 to obtain more information regarding objects in the field of view than may be obtained with a small beam size. Furthermore, by using the beam expander as part of the lens system, the optical device 400 may conserve cost that would otherwise be consumed by using a lens system and a separate beam expander.

Figure 5:
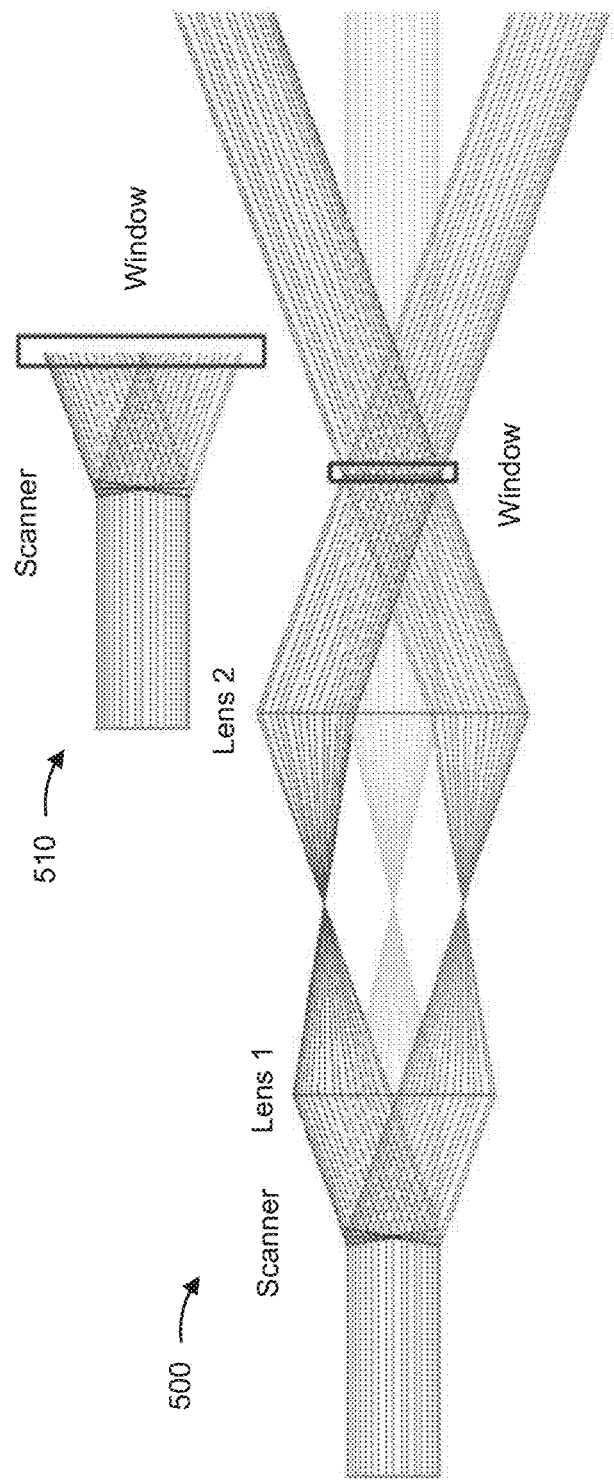
FIG. 5 is a diagram of an example optical device including a scanner, a lens system, and a window, and an example optical device including a scanner and a window.

FIG. 5 is a diagram of an example optical device 500 including a scanner, a lens system, and a window and an example optical device 510 including a scanner and a window. As shown in FIG. 5, the optical device 500 may include a scanner, a lens system including lens 1 and lens 2, and a window. In some implementations, the scanner, the lens system, lens 1, and lens 2 of the optical device 500 may be similar to scanner 1, the lens system, lens 1, and lens 2 of the optical device 200 of FIG. 2.

As shown in FIG. 5, the optical device 510 may include a scanner and a window. In some implementations, the scanner of the optical device 510 may be similar to scanner 1 and/or scanner 2 of the optical device 200 of FIG. 2. Additionally, or alternatively, the scanner of the optical device 510 may be similar to the scanner of the optical device 500 (e.g., have a same size, tilt angle, axis of orientation, axes of orientation, and/or the like). For example, the scanner of optical device 500 and the scanner of optical device 510 may be single-axis angular scanning components having horizontal axes to provide vertical angular offsets.

In some implementations, the window of the optical device 500 and the window of optical device 510 may be windows in a housing of a lidar optical subassembly, where the windows permit optical components (e.g., the scanner, lens 1, lens 2, one or more receivers, and/or the like) within the lidar optical subassembly to optically communicate with an environment external to the housing. For example, the windows may transmit light, be scratch-resistant, and protect the components of the optical device 500 and/or the optical device 510. In some implementations, the windows may include a glass substrate, a sapphire substrate, and/or the like.

As shown in FIG. 5, the window of the optical device 500 and the window of the optical device 510 may permit the scanners to scan the optical beams across fields of view having a same height. As also shown in FIG. 5, the window of the optical device 500 may be smaller than the window of the optical device 510. In some implementations, the window of the optical device 510 may be larger than the scanner to accommodate the vertical angular offset provided to the optical beam by the scanner. However, the window of optical device 500 may be of similar size to the scanner because the lens system (e.g., lens 1 and lens 2) achieves a 1:1 image of the scanner on the window. For example, if a focal length f1 of lens 1 equals a focal length f2 of lens 2, then the lens system achieves a 1:1 image of the scanner on the window.

In this way, the lens system (e.g., lens 1 and lens 2) may permit the optical device 500 to have a smaller window than the window of the optical device 510, while maintaining a width of the field of view. By reducing the size of the window, the optical device 500 may have a lower cost (e.g., due to less window material and/or the like) and may have a reduced size as compared to the optical device 510.

In some implementations, the optical device 500 may include a lens system configured to increase a size of the optical beam. For example, the optical device 500 may include a lens system that includes a beam expander to increase the size of the optical beam (e.g., before passing through the window) and achieve a higher resolution than may be achieved with the small beam size. For example, the increased beam size may permit the optical device 500 to obtain more information regarding objects in the field of view than may be obtained with a small beam size.

In some implementations, the optical device 500 may include a lens system configured to decrease, reduce, and/or the like a size of the optical beam. For example, the optical device 500 may include a lens system that reduces the size of the optical beam (e.g., before passing through the window) and achieves a larger field of view than may be achieve with a large beam size. For example, the reduced beam size may permit the scanner to have a larger tilting angle (e.g., to provide a larger angular offset and/or the like) than may be used with a large beam size.

In this way, a common platform (e.g., including a source, one or more scanners, a lens system, a window, an optomechanical bench, and/or the like) may be tailored for different application requirements with minimal changes. For example, a lens system configured to increase a size of the optical beam may be used to achieve some application requirements, while a lens system configured to decrease a size of the optical beam may be used to achieve other application requirements.

In some implementations, a scanner may have a resonant frequency (e.g., a frequency at which a scanner may be tilted, oscillated, and/or the like), where an optical device with a scanner having a higher resonant frequency may have improved performance as compared with an optical device with a scanner having a lower resonant frequency. In some implementations, the resonant frequency of a scanner may depend on scanner mirror size and tilting angle. For example, larger scanner mirror sizes may have lower resonant frequencies than resonant frequencies of smaller scanner mirror sizes. Additionally, or alternatively, larger tilting angles may have lower resonant frequencies than resonant frequencies of smaller tilting angles.

As described herein, an optical device may include a lens system configured to increase and/or decrease a size of the optical beam. In some implementations, the increase and/or decrease may be described as a beam expansion ratio (e.g., in the case of an increase in the size of the optical beam) or a beam reduction ratio (e.g., in the case of a decrease in the size of the optical beam). In some implementations, an optical device may include a scanner and a lens system and may use the beam expansion ratio or the beam reduction ratio of the lens system to tradeoff tilting angle and scanner mirror size while maintaining the resonant frequency of the scanner.

For example, the lens system may have a beam expansion ratio of 2 (e.g., the optical beam is twice as big after passing through the lens system and/or the like), and the scanner may have a tilting angle that is reduced by half based on the beam expansion ratio and may also have a scanner mirror size that is reduced by half based on the beam expansion ratio. In such an example, the scanner may have an increased resonant frequency due to the reduced tilting angle and reduced scanner mirror size, which may improve performance of the optical device. Additionally, or alternatively, although the reduced tilting angle may result in a reduction in performance of the optical device, the reduced scanner mirror size may result in a performance improvement greater than the reduction in performance resulting from the reduced tilting angle.

Figure 6A:
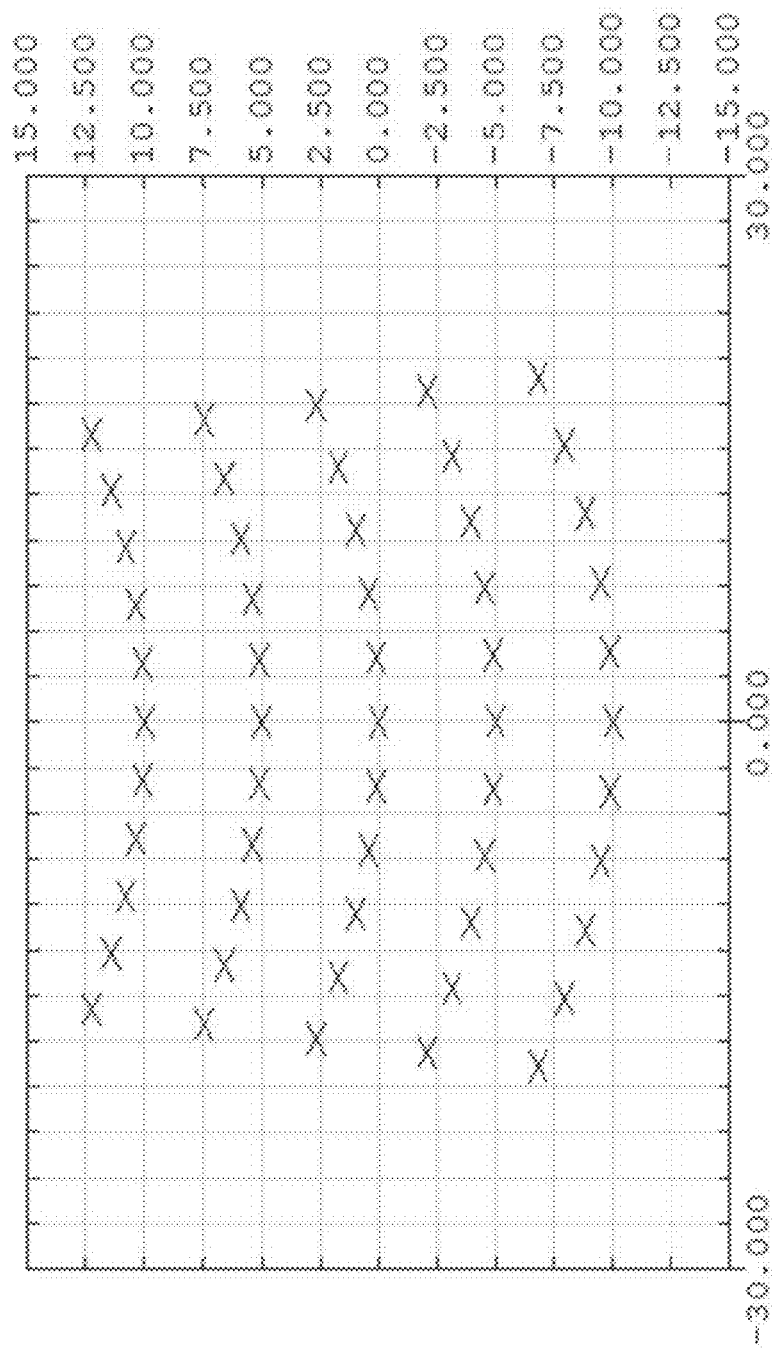
FIG. 6A is a diagram of an example graph showing field distortion.

FIG. 6A is a diagram of an example graph 610 showing field distortion. In some implementations, optical components (e.g., a scanner, a lens system, and/or the like) and/or combinations of optical components within an optical device (e.g., optical device 100, optical device 200, optical device 300, optical device 400, optical device 500, optical device 510, and/or the like) may generate field distortion such that, as shown in FIG. 6A, one or more scan lines of the optical device may not be not linear. For example, as shown in the graph 610 of FIG. 6A, the scan lines of the optical device may be curved.

Figure 6B:
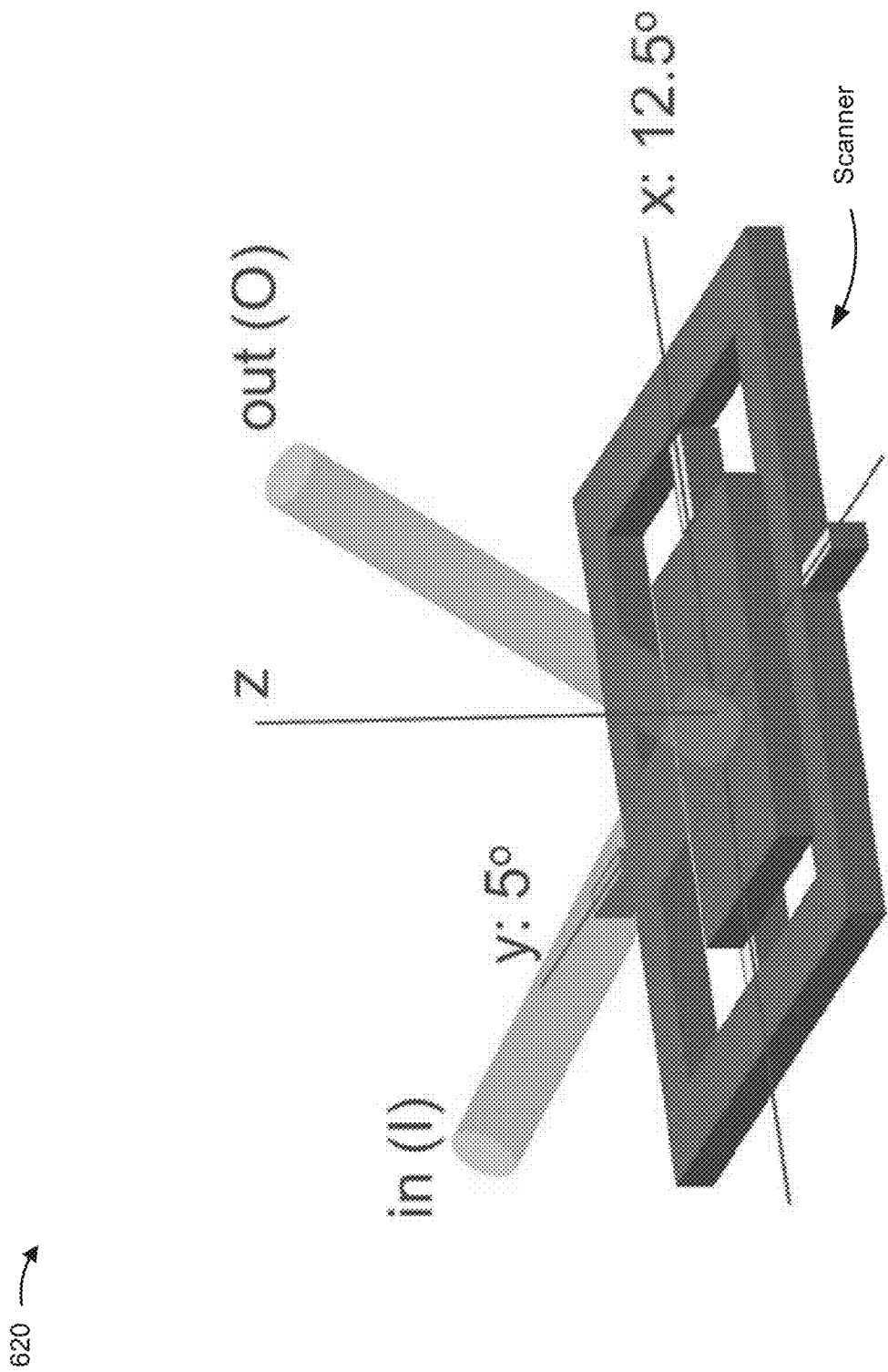
FIG. 6B is a diagram of an example adjustment to a scanner to compensate for the field distortion of FIG. 6A.

FIG. 6B is a diagram of an example adjustment 620 to a scanner to compensate for the field distortion in the optical device of FIG. 6A. In some implementations, the scanner of FIG. 6B may be a dual-axis angular scanning component having a y axis (e.g., a horizontal axis) to provide a vertical angular offset and an x axis (e.g., a vertical axis) to provide a horizontal angular offset. In some implementations, the optical device may adjust a tilting angle of the scanner on the y axis and/or adjust a tilting angle of the scanner on the x axis to compensate for the field distortion and/or achieve linear scan lines.

For example, and as shown in FIG. 6B, the optical device may adjust the tilting angle of the scanner on the y axis by 5 degrees and adjust the tilting angle of the scanner on the x axis by 12.5 degrees. In this way, the optical device may adjust the angle at which an incoming optical beam (e.g., shown as in (I)) is reflected by the scanner as an outgoing optical beam (e.g., shown as out (O)) to compensate for the field distortion and/or achieve linear scan line.

In some implementations, the optical device may include a first scanner and a second scanner, where the first scanner and the second scanner are dual-axis angular scanning components. In some implementations, the first scanner and/or the second scanner may be configured to compensate for field distortion of the optical beam. In some implementations, the optical device may adjust the first scanner and/or the second scanner to compensate for field distortion. For example, the optical device may adjust the first scanner to compensate for field distortion caused by optical components positioned between a source of the optical beam and the first scanner and may adjust the second scanner to compensate for field distortion caused by optical components positioned between the first scanner and the second scanner.

Figure 7:
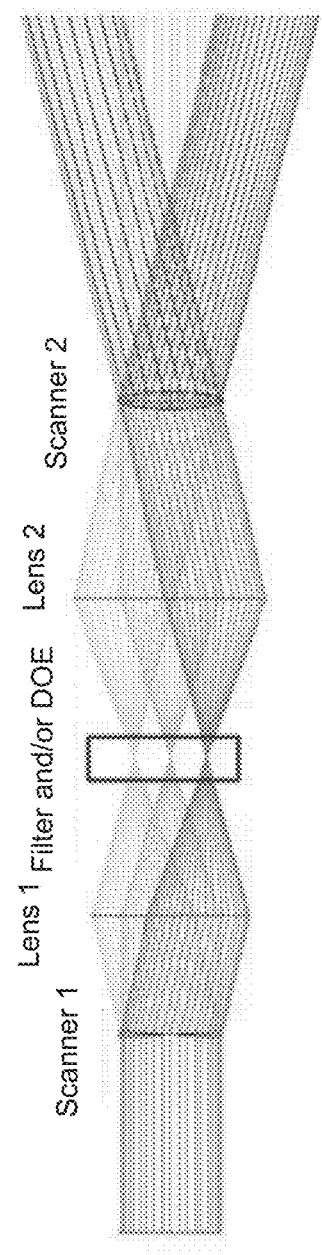
FIG. 7 is a diagram of an example optical device including two scanners and a lens system.

FIG. 7 is a diagram of an example optical device 700 including two scanners and a lens system. As shown in FIG. 7, the optical device 700 may include scanner 1, scanner 2, and a lens system including lens 1 and lens 2 as well as a filter and/or a diffractive optical element (DOE). In some implementations, scanner 1, scanner 2, the lens system, lens 1, and lens 2 of the optical device 700 may be similar to scanner 1, scanner 2, the lens system, lens 1, and lens 2 of the optical device 200 of FIG. 2.

In some implementations, the lens system may include the filter and/or the DOE in a location where the size of the optical beam is small relative to the filter and/or the DOE. For example, and as shown in FIG. 7, the filter and/or the DOE may be positioned between lens 1 and lens 2. In some implementations, the filter and/or the DOE may be positioned at a location corresponding to a focal point of lens 1 and a focal point of lens 2.

In some implementations, the lens system may include the filter and/or the DOE to provide angular dependent modification to the optical beam, to translate an angular offset of the optical beam to a spatial offset of the optical beam, and/or the like. For example, the filter and/or the DOE may compensate for and/or correct field distortion caused by optical components (e.g., scanner 1, scanner 2, the lens system, lens 1, lens 2, other lenses, other mirrors, and/or the like) and/or combinations of optical components within the optical device 700. By positioning the filter and/or the DOE at a location where the size of the optical beam is small relative to the filter and/or the DOE, the optical device 700 may improve the performance of the filter and/or the DOE when providing angular dependent modification to the optical beam, field distortion compensation and/or correction to the optical beam, and/or the like.

As indicated above, FIGS. 1-5, 6A-6B, and 7 are provided merely as one or more examples. Other examples may differ from what is described with regard to FIGS. 1-5, 6A-6B, and 7.

The number and arrangement of components shown in FIGS. 1-5, 6A-6B, and 7 are provided as one or more examples. In practice, there may be additional components, fewer components, different components, or differently arranged components than those shown in FIGS. 1-5, 6A-6B, and 7. Furthermore, two or more components shown in FIGS. 1-5, 6A-6B, and 7 may be implemented within a single component, or a single component shown in FIGS. 1-5, 6A-6B, and 7 may be implemented as multiple, distributed components. Additionally, or alternatively, a set of components (e.g., one or more components) of optical device 100, optical device 200, optical device 300, optical device 400, optical device 500, optical device 510, and optical device 700 may perform one or more functions described as being performed by another set of components.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, the term "component" is intended to be broadly construed as hardware, firmware, and/or a combination of hardware and software.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An optical device, comprising:
a first scanning component configured to receive an optical beam along an optical axis;
a second scanning component spaced apart from the first scanning component along the optical axis; and
a lens system positioned between the first scanning component and the second scanning component,
wherein the lens system is configured to:
receive the optical beam from the first scanning component,
change a collimated beam size of the optical beam, and
refract the optical beam to prevent an angular offset of the optical beam from translating into a spatial offset of the optical beam on the second scanning component.

2. The optical device of claim 1, wherein the lens system includes a first lens to increase the collimated beam size of the optical beam.

3. The optical device of claim 1, wherein the lens system includes a second lens to collimate the optical beam.

4. The optical device of claim 1, wherein the lens system includes a first lens with a first focal length and a second lens with a second focal length, and
    wherein the change in the collimated beam size is based at least in part on a difference between the first focal length and the second focal length.

5. The optical device of claim 1, wherein the first scanning component is configured to tilt around an axis to create an angular offset of the optical beam relative to the optical axis.

6. The optical device of claim 5, wherein the second scanning component is configured to tilt around the axis.

7. The optical device of claim 1, wherein the lens system includes at least one of a filter or a diffractive optical element positioned at a focal point of the lens system to refract the optical beam.

8. An optical device, comprising:
    a first scanning component configured to receive an optical beam along an optical axis,
        wherein the first scanning component is configured to tilt around an axis to create an angular offset of the optical beam relative to the optical axis;
    a second scanning component spaced apart from the first scanning component along the optical axis,
        wherein the second scanning component is configured to tilt around the axis; and
    a lens system positioned between the first scanning component and the second scanning component,
        wherein the lens system is configured to:
            receive the optical beam from the first scanning component,
            increase a collimated beam size of the optical beam, and
            refract the optical beam to prevent an angular offset of the optical beam from translating into a spatial offset of the optical beam on the second scanning component.

9. The optical device of claim 8, wherein the lens system includes a first lens to increase the collimated beam size of the optical beam.

10. The optical device of claim 8, wherein the lens system includes a second lens to collimate the optical beam.

11. The optical device of claim 8, wherein the lens system includes a first lens with a first focal length and a second lens with a second focal length, and
    wherein the increase in the collimated beam size is based at least in part on a difference between the first focal length and the second focal length.

12. The optical device of claim 8, wherein the lens system includes a first lens with a first focal point and a second lens with a second focal point, and
    wherein the first scanning component is located at the first focal point, and
    wherein the second scanning component is located at the second focal point.

13. The optical device of claim 8, wherein the lens system is further configured to provide angular dependent modification to the optical beam.

14. The optical device of claim 8, wherein the lens system includes at least one of a filter or a diffractive optical element positioned at a focal point of the lens system to refract the optical beam.

15. An optical device, comprising:
    a first scanning component configured to receive an optical beam along an optical axis;
    a second scanning component spaced apart from the first scanning component along the optical axis; and
    a lens system positioned between the first scanning component and the second scanning component,
        wherein the lens system is configured to:
            receive the optical beam from the first scanning component,
            change a collimated beam size of the optical beam, and
            compensate for field distortion of the optical beam.

16. The optical device of claim 15, wherein the lens system includes a first lens to increase the collimated beam size of the optical beam and a second lens to collimate the optical beam.

17. The optical device of claim 15, wherein the lens system includes a first lens with a first focal length and a second lens with a second focal length, and
    wherein the change in the collimated beam size is based at least in part on a difference between the first focal length and the second focal length.

18. The optical device of claim 15, wherein the first scanning component is configured to tilt around an axis to create an angular offset of the optical beam relative to the optical axis.

19. The optical device of claim 18, wherein the second scanning component is configured to tilt around the axis.

20. The optical device of claim 15, wherein the lens system includes at least one of a filter or a diffractive optical element positioned at a focal point of the lens system to compensate for the field distortion.

\* \* \* \* \*